United States Patent
Johnson et al.

[11] Patent Number: 5,812,083
[45] Date of Patent: Sep. 22, 1998

[54] NON-COOPERATIVE TARGET IDENTIFICATION USING ANTENNA PATTERN SHAPE

[75] Inventors: Peter W. Johnson, Plano; Lawrence M. Backer, Blue Ridge, both of Tex.

[73] Assignee: Raytheon TI Systems, Inc., Lewisville, Tex.

[21] Appl. No.: 798,894

[22] Filed: Feb. 11, 1997

Related U.S. Application Data

[60] Provisional application No. 60/012,129, Feb. 23, 1996.
[51] Int. Cl.⁶ .......................... G01S 13/78; G01S 7/292; G01S 7/40; G01S 7/41
[52] U.S. Cl. .......................... 342/90; 342/13; 342/192; 342/196
[58] Field of Search .......................... 342/45, 64, 90, 342/192, 193, 196, 13, 173

[56] References Cited

U.S. PATENT DOCUMENTS

| | | | |
|---|---|---|---|
| 5,233,354 | 8/1993 | Roth et al. | 342/160 |
| 5,235,339 | 8/1993 | Morrison et al. | 342/159 |
| 5,343,208 | 8/1994 | Chesley | 342/196 |
| 5,481,269 | 1/1996 | Imhoff et al. | 342/90 |
| 5,504,487 | 4/1996 | Tucker | 342/90 |
| 5,612,700 | 3/1997 | Tucker | 342/90 |

*Primary Examiner*—John B. Sotomayor
*Attorney, Agent, or Firm*—Baker & Botts, L.L.P.

[57] ABSTRACT

A method of classification of a device by recognizing distorted signals, generally a RF antenna pattern, emanating therefrom wherein a trainable recognition system, preferably a neural network, is provided. Known distorted signals are applied to the trainable recognition system to train the recognition system to recognize individually each of a plurality of different signals having distortion therein. Unknown distorted signals are then provided emanating from a remote device and the unknown distorted signals are then used to classify the remote device by analyzing the received unknown distorted signals in the trained recognition system. The steps of training and classifying each include the step of converting the signals from the time domain to the frequency domain. The steps of training and classifying also can each include the step of down sampling the frequency domain signals to compress the signature content.

17 Claims, 3 Drawing Sheets

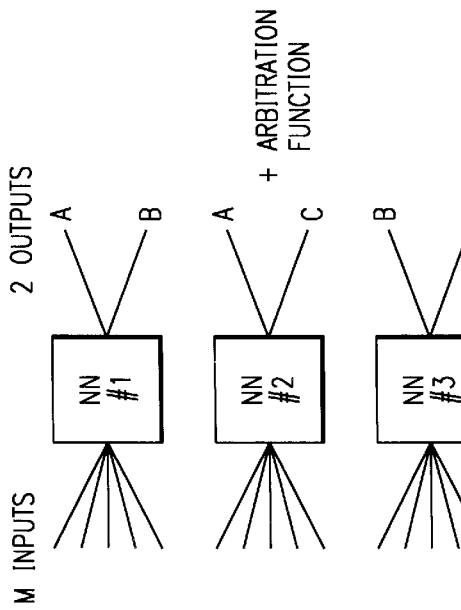
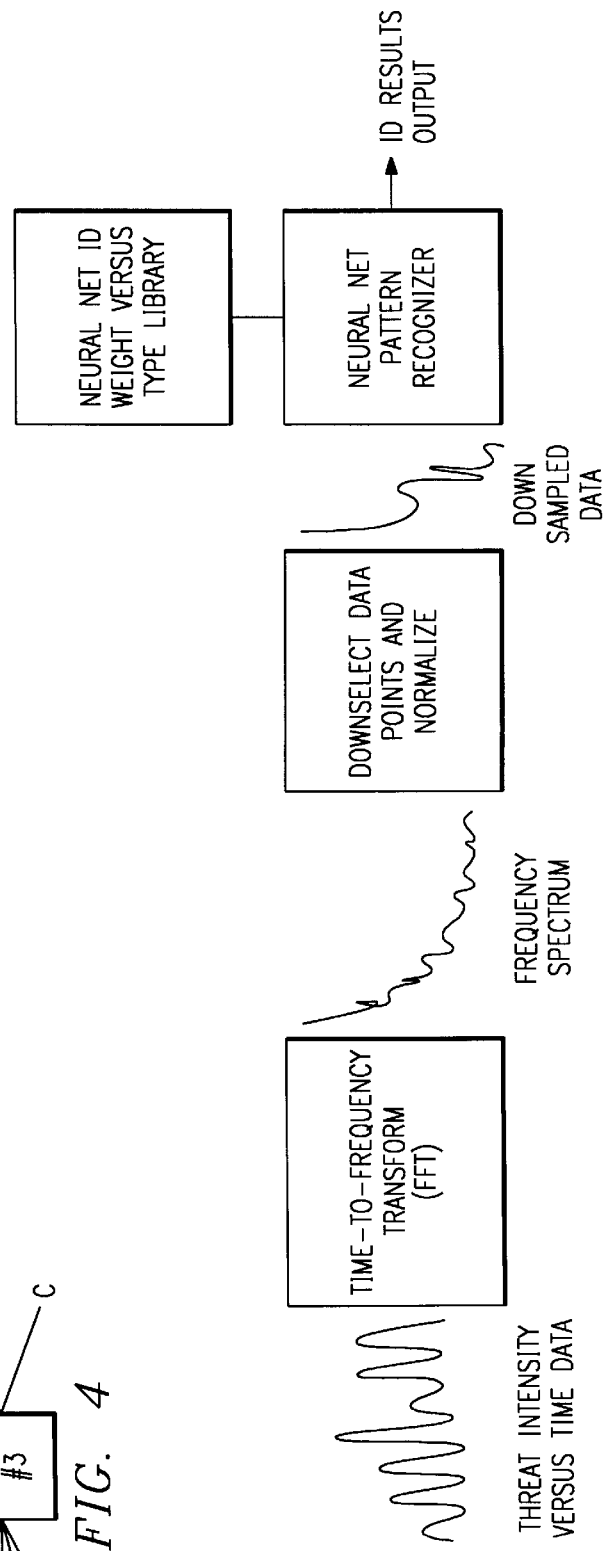

NON-COOPERATIVE TARGET IDENTIFICATION USING ANTENNA PATTERN SHAPE

This application claims priority under 35 USC § 119 (e) of provisional number 60/012,129, filed Feb. 23, 1996.

BACKGROUND OF THE INVENTION

1. Field of the Invention

This invention relates to non-cooperative target identification (NCTI) and, more specifically, to emitter identification, such as, for example, radar identification, by real time passive radio frequency (RF) sensing systems.

2. Brief Description of the Prior Art

State of the art air-to-air weapon systems have the ability to operate at long, safe, stand-off ranges. However, the use of such weapons requires positive identification of the target prior to engagement. Active air-to-air identify friend or foe (IFF) interrogation can be exploited by the target to betray the presence, location and identity of the interrogator. Therefore, stealth advantage is forfeited by the use of active interrogator equipment, making the use of such active equipment undesirable where stealth is essential. Identification via infrared sensors can be obtained at moderate ranges, however such devices have limited capability in adverse weather conditions. Visual identification is limited to short range and subject to human error. It is therefore readily apparent that a substantial need exists for passive, long range, all-weather, reliable air-to-air identification.

In order to meet the above noted needs, passive RF sensing has become the sensing method of choice. Present systems perform an automated identification function which often produces ambiguous or erroneous emitter identifications due to hardware measurement errors, software algorithm inadequacies and dense electro-magnetic environments. Moreover, the programmability of modern radars makes it difficult to obtain accurate expected emitter data on the basis of the presently identified radar identification attributes. Passive RF sensor systems receive and characterize electro-magnetic energy which is then passed to an automated identification function. The automated identification function matches the active radar characteristics of the target or targets being observed (as measured by the passive RF sensor system) against a library of previously stored expected emitter signatures and outputs a list of possible emitter identifications to the operator. This information may then be used to construct an accurate and timely picture of the current battlefield situation.

Typical RF sensing system identification attributes are carrier frequency, pulse repetition interval (PRI), pulse width (PW), PRI type, scan type (for main beam intercepts only) and scan rate (for main beam intercepts only). The traditional approach suffers because (1) it does not exploit scan pattern shape and (2) the other scan-related information is typically limited to main beam intercepts only. Also, generally speaking, the above mentioned parameters which are not for main beam intercepts only are of limited utility because they are reprogrammed by the emitter operator or automatically by the system and cannot be depended upon as stable signature attributes.

SUMMARY OF THE INVENTION

In accordance with the present invention, there is provided a new procedure for emitter identification which exploits RF signal intensity and/or polarization time patterns generated by airborne radar emitters in order to make classification decisions. The precision and/or degree of classification is determined by the complexity designed into the recognition system, the intensity versus time waveform or distortion of the emitted signal by the emitter equipment which is common to a particular type or types of equipment provides a signature for that particular type or types of equipment. The recognition process facilitates non-cooperative identification situations, such as where the operator can change the parameters, because it is completely passive. The recognition process identifies the platform (i.e., the aircraft, ship, tank, helicopter or other vehicle hosting a radar) or physical characteristics of the platform. Possible physical characteristics include antenna type, radome shape, radome material and accessory hardware such as pitot booms, vanes and lightning strips. These are very powerful identification attributes because they are not readily changeable. The recognition of a platform or physical characteristics of a platform based on a received intensity profile is unique.

Briefly, RF energy from an emitter, such as a known or simulated radar signal for training of the recognition system or a signal to be classified by the trained recognition system, is received by a passive antenna/receiver over time so that many repetitions of the signal are received and used to train a pattern recognition algorithm (such as a neural network). The antenna pattern profile, during training, for each different type of pattern to be classified, trains the network to recognize that pattern. A pattern recognition network capable of performing the functions enunciated herein can be used. The pattern recognition network of choice is a neural network. When an emitted signal to be classified is later received by the antenna/receiver, this signal is now recognized by the antenna pattern recognition procedure. The recognized physical attributes or platform of the antenna are used to classify the emitter.

Though the system is described with reference to a digital system, it should be understood that the use of an analog system is contemplated as a part of the present invention and that the alteration of the circuitry to provide such a system in accordance with the present invention should be readily apparent to one of ordinary skill in the art.

BRIEF DESCRIPTION OF THE DRAWINGS

FIG. 3 is a schematic block diagram of the antenna pattern recognition process of FIG. 1 demonstrating processing a pattern for classification after training has been completed in accordance with the present invention;

FIG. 4 is a diagram of a neural network of the type that can be used in accordance with the present invention.

DESCRIPTION OF THE PREFERRED EMBODIMENT

Figure 1:
FIG. 1 is a schematic block diagram of functions for performing the training and classification in accordance with the present invention.
Figure 5:
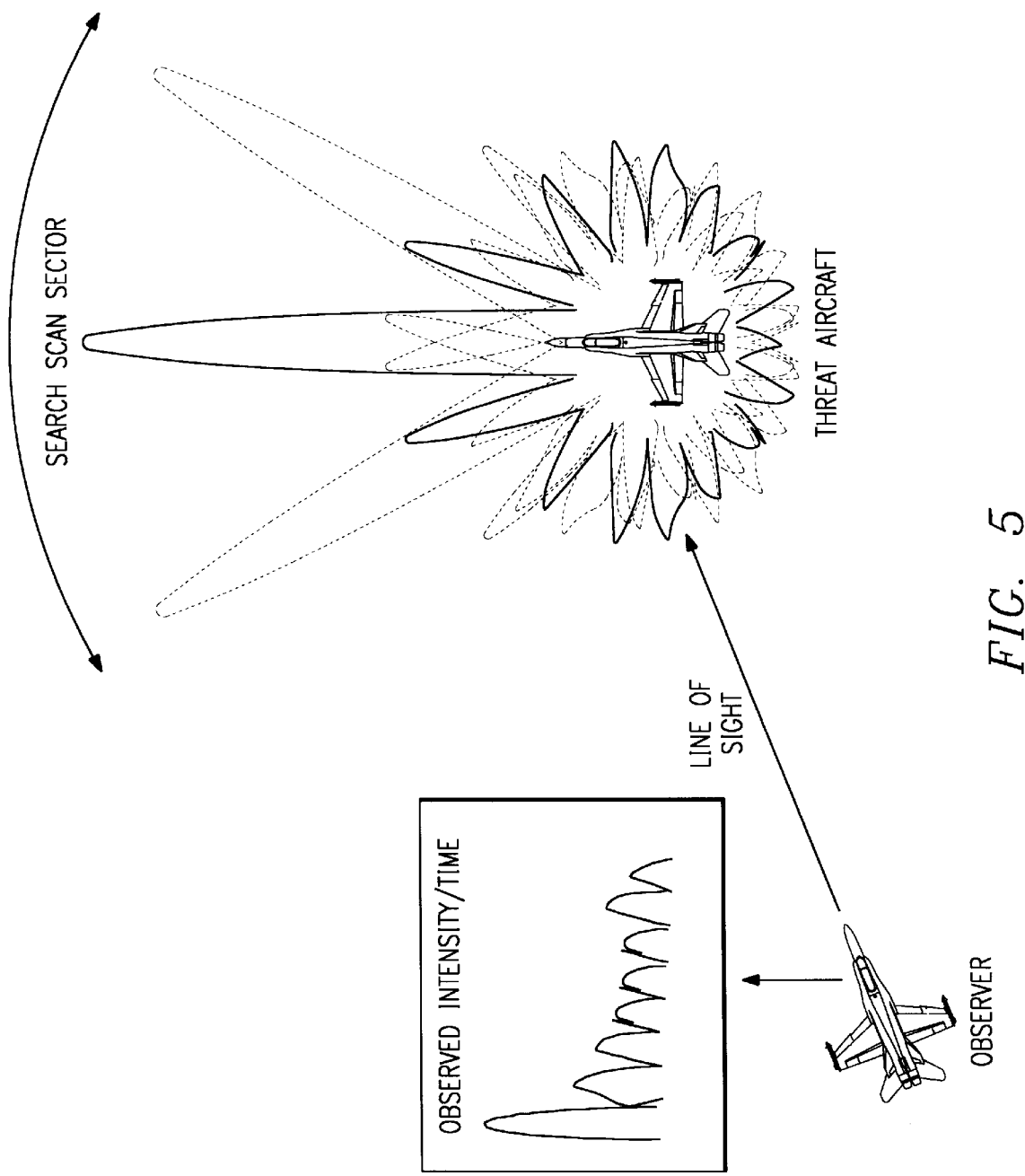
FIG. 5 is a diagram showing collection of an intensity pattern.

Referring to FIG. 1, there is shown a simplified block diagram of the circuitry for the procedure in accordance with the present invention. RF energy from an emitter, such as a known radar signal for training or a signal from a potential threat to be classified, is received by a passive antenna/ receiver over time so that scan patterns of the signal are received and collected as shown in FIG. 5. In FIG. 5, an observer, which can be an aircraft with passive antenna/ receiver, monitors RF emissions passively and locates a signal which can be a training signal or a potential threat as defined hereinabove, such as, for example, an aircraft which emits RF energy. This energy is received by the observer during the scan and provides observed intensity/time information which is stored in a data base at the observer location or is retained to establish a data base in general for threat and/or non-threat aircraft or the like. The antenna pattern profile, during training, for each different type of pattern to be classified, is collected many times and trains the network to recognize that pattern. When an emitted signal is later received by the antenna/receiver, this signal is now recognized by the antenna pattern recognition procedure. The recognized physical attributes or platform of the antenna are used to classify the emitter.

Figure 2:
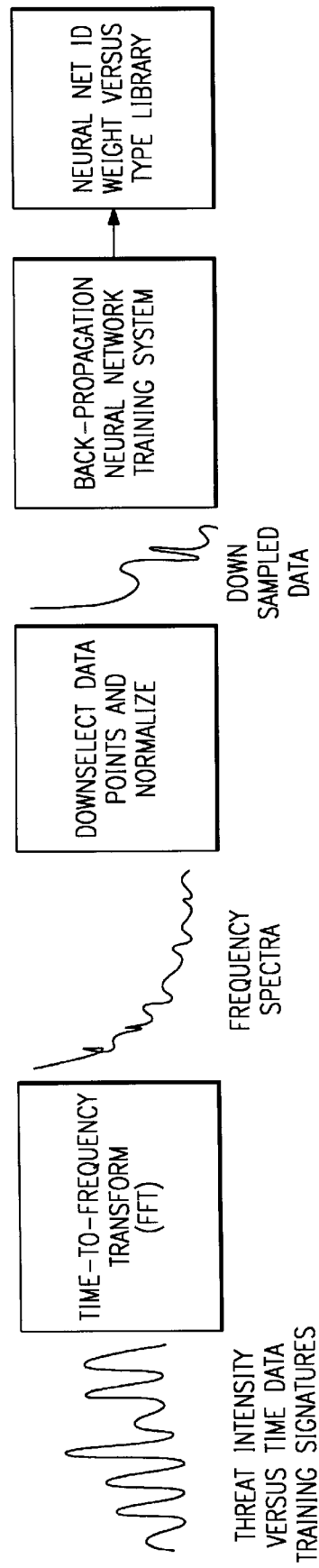
FIG. 2 is a schematic block diagram of the antenna pattern recognition process of FIG. 1 demonstrating training pattern generation as used in accordance with the present invention.

To train the recognition circuit initially, with reference to FIGS. 1 and 2, measured or simulated RF signals of a plurality of different types representing different potential threats and/or non-threats, (for example, an RF signal of a first type that would be received from a known first emitter and an RF signals of a second type that would be received from a known second emitter) are provided to the antenna/ receiver and sent to the antenna pattern recognition system to train the recognition system. These signals of a first type and of a second type could be, for example, radar signals of the type that would be transmitted by an F15 as the first emitter and radar signals of the type that would be transmitted by a MIG 25 as the second emitter. The time domain signals received are transformed into frequency domain signals, preferably by a fast Fourier transform (FFT) as shown in FIG. 2. The frequency domain signals are then normalized to a standard amplitude versus frequency and a sub-set of the data containing signature features is selected and this data is fed to a first neural network of a neural network training system, shown in greater detail in FIG. 4. The weights for the first neural network (for example, neural network #1 of FIG. 4) are developed in the training system using a back propagation or other neural network training algorithm, as is well known, and saved for later use in conjunction with the first neural network when an emitted pattern is to be tested for recognition. The first neural network in FIG. 4 is now capable of recognizing that the emitted signal is, for example, an F15 (pattern A) or a MIG 25 (pattern B) or neither. The M inputs synthesize the analog values of the pattern. The same procedure as discussed above for signals A and B is now provided for a second neural network (for example, neural network #2 of FIG. 4) wherein the emitted signals are, for example, B and C, where C is enable upon recognition of the RF pattern emitted by, for example an F16. The second neural network is now capable of recognizing that the emitted signal is A or C or neither. This procedure continues for each possible emitted signal to be detected and stored in the data base which is the neural network system wherein each type of emitted signal in the data base is associated with two of the neural networks of the training system. Three neural networks are required when there are three different patterns in the data base, six neural networks would be required for four different patterns in the data base, etc.

For pattern classification, the circuitry as shown in conjunction with FIGS. 1 and 3 is used with the neural network now having been trained. The signal is then subjected to an FFT to change the signal from the time domain to the frequency domain. The frequency domain signal is then down sampled and normalized. This normalized signal is then applied to the input of each of the neural networks of the neural network system. Each of the neural networks will show a match, a no match or a cannot identify (the no match or cannot identify can be different outputs or the same output). A match is generally made when two of the neural networks recognize the same signal, for example outputs for A, have detected a matching signal, indicating, for example, that an F15 radar has emitted the received signal. The system recognizes which of the neural networks have detected a match and thereby recognizes the particular aircraft or emitter providing the emitted signal.

While the preferred embodiment has been shown as a digital implementation, it should be understood that the system can also be designed with an analog format and this format also forms a part of the invention.

Referring now to FIG. 4, there is shown a typical neural network system designed for recognition of three emitted signals labelled A, B and C. Neural network #1 receives all of the M inputs and provides a recognition signal for emitted signals A and B. Neural network #2 receives all of the M inputs and provides a recognition signal for emitted signals A and C. Neural network #3 receives all of the M inputs and provides a recognition signal for emitted signals B and C. Standard circuitry (not shown) analyzes the outputs of each of the neural networks and recognizes which if any of emitted signals A, B or C were detected since each of the three signals A, B and C will be uniquely output from only two of the six possible outputs. If none of the outputs are enabled, then the system has not recognized the received RF signal. If one or more than two of the outputs are enabled, then the system is again unable to recognize the source of the RF signals received.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A method of passive classification of a device by recognizing signals emanating from said device which comprises the steps of:

(a) providing a trainable recognition system;

(b) providing known signature signals to said trainable recognition system to train said recognition system to recognize individually each of a plurality of different signals having signatures therein, each of said known signature signals representing an RF transmitter antenna scan pattern;

(c) providing unknown signature signals emanating from a remote device; and (d) classifying said remote device by analyzing the received unknown signals in the trained recognition system.

2. The method of claim 1 wherein said trainable recognition system includes a neural network system.

3. The method of claim 2 wherein said steps of training and classifying each include the step of converting said signals from the time domain to the frequency domain.

4. The method of claim 3 wherein said steps of training and classifying each include the step of down selecting the number of samples and normalizing the data.

5. The method of claim 4 wherein said RF antenna scan pattern represents a received signal intensity versus time profile from said remote device.

6. The method of claim 3 wherein said RF antenna scan pattern represents a received signal intensity versus time profile from said remote device.

7. The method of claim 2 wherein said steps of training and classifying each include the step of down selecting the number of samples and normalizing the data.

8. The method of claim 7 wherein said RF antenna scan pattern represents a received signal intensity versus time profile from said remote device.

9. The method of claim 2 wherein said RF antenna scan pattern represents a received signal intensity versus time profile from said remote device.

10. The method of claim 1 wherein said steps of training and classifying each include the step of converting said signals from the time domain to the frequency domain.

11. The method of claim 10 wherein said steps of training and classifying each include the step of down selecting the number of samples and normalizing the data.

12. The method of claim 11 wherein said RF antenna scan pattern represents a received signal intensity versus time profile from said remote device.

13. The method of claim 10 wherein said RF antenna scan pattern represents a received signal intensity versus time profile from said remote device.

14. The method of claim 1 wherein said steps of training and classifying each include the step of down selecting the number of samples and normalizing the data.

15. The method of claim 14 wherein said RF antenna scan pattern represents a received signal intensity versus time profile from said remote device.

16. The method of claim 1 wherein said RF antenna scan pattern represents a received signal intensity versus time profile from said remote device.

17. An apparatus, comprising:
a recognition system, and means for supplying to said recognition system unknown signature signals emanating from a remote device, said recognition system including means for passively classifying the remote device by analyzing said signature signals emanating therefrom with reference to a plurality of different reference signals, each of said reference signals representing a respective RF transmitter antenna scan pattern.

* * * * *